United States Patent Office 2,925,369
Patented Feb. 16, 1960

2,925,369

ABNORMAL ADDITION OF HYDROGEN BROMIDE TO VINYLAROMATIC COMPOUNDS

Charles E. Grabiel and Joseph L. Russell, Midland, and Henry Volk, Bay City, Mich., assignors to The Dow Chemical Company, Midland, Mich., a corporation of Delaware No Drawing. Application July 30, 1957
Serial No. 675,029

10 Claims. (Cl. 204—163)

This invention concerns a method for the abnormal addition of hydrogen bromide to monovinylaryl and divinylaryl compounds. More particularly, it concerns a method wherein monovinylaryl and divinylaryl compounds are reacted with gaseous hydrogen bromide in the presence of certain wavelengths of light whereby abnormal addition of the hydrogen bromide is promoted to the substantial exclusion of the normal addition product.

It has been taught in U.S. Patent 2,307,552 that unsaturated aliphatic hydrocarbons can be reacted abnormally with hydrogen halides such as hydrogen chloride or hydrogen bromide by exposing such reactants to ultraviolet radiation, preferably to radiation with wavelengths less than about 3000 A. However, when vinylaryl compounds, by which term is included monovinylaryl and divinylaryl compounds, are reacted with hydrogen bromide in the presence of ultraviolet radiation, hydrogen bromide addition begins to take place contrary to the Markownikoff rule (abnormal addition). In a relatively short time, however, a competing photopolymerization reaction is initiated due to the absorption by the vinylaryl compounds of radiation with wavelengths less than 2900 A. whereby such vinylaryl compounds are polymerized to form a film on the surface of the light transmitting reactor window. Such a film is opaque to light and progressively reduces the rate of abnormal addition of hydrogen bromide to the point where it is uneconomic. The amount of film formation increases with increasing intensity of radiation having wavelengths less than 2900 A. and with increasing time. Consequent shutdowns and cleaning of reactors are costly both in labor and in loss of production.

In accordance with this invention, it has now been discovered that such disadvantages attributable to the ultraviolet radiation which causes polymerization of vinylaryl compounds and filming of the light transmitting reactor window can be avoided by filtering out ultraviolet radiation with wavelengths less than 2900 A. and transmitting to the reaction medium radiation with wavelengths of 2900 A. to about 7000 A., preferably between 2900 A. and 3700 A. Thereby abnormal addition of hydrogen bromide to vinylaryl compounds is promoted and film forming polymer formation is substantially minimized. It has been discovered that filters such as the glasses including solarized Pyrex and Corex D, and an aqueous copper sulfate solution are effective in filtering out ultraviolet radiation with wavelengths less than 2900 A. while transmitting radiation having longer wavelengths. These filters are, therefore, effective in transmitting radiation in the range which promotes abnormal addition of hydrogen bromide to vinylaryl compounds, while at the same time preventing detrimental film formation for about 24 hours and longer, which film formation renders the light transmitting reactor window opaque to light radiation. Solarized Pyrex (1 mm.) absorbs ultraviolet radiation with wavelengths less than 3100 A., Corex D (2 mm.) absorbs wavelengths less than 2900 A. while a cupric sulfate solution containing 0.025 lb. of $CuSO_4 \cdot 5H_2O$ per lb. of water (0.5 cm.) absorbs wavelengths less than 2900 A. All of these filters, therefore, absorb the undesired polymerization promoting ultraviolet radiation having wavelengths less than 2900 A. while transmitting radiation having wavelengths of 2900 A. and above. The transmitted wavelengths are effective in promoting the desired abnormal addition of hydrogen bromide to vinylaryl compounds.

Vinylaryl compounds operable in the practice of this invention include both monovinylaryl and divinylaryl hydrocarbons and ring substituted homologs and analogs thereof which react with hydrogen bromide to form 2-bromoethyl-substituted products. These include styrene and alkylstyrenes such as vinyltoluene, dimethylstyrenes, vinylmesitylene, chlorinated styrenes such as monochloro and dichlorostyrenes, chloromethylstyrene, alkoxystyrenes such as methoxystyrene, hydroxystyrene, divinylbenzene, alkyldivinylbenzene, chlorodivinylbenzene, divinylnaphthalene, etc.

The vinylaryl compounds, advantageously in solution in proportions between one or more volume parts of an inert hydrocarbon or chlorinated hydrocarbon solvent (such as pentane, hexane, heptane, benzene, toluene, chlorobenzene, tetrachloroethylene, carbon tetrachloride, 1,1,1-trichloroethane, etc.) per part of vinylaryl compound, are reacted at a temperature between the freezing point of the solvent and 100° C. with a stoichiometric proportion of hydrogen bromide, advantageously present in up to 20 weight percent excess in the reaction medium, while being subjected to radiation having wavelengths of 2900 A. and above. The reaction is substantially instantaneous, giving, for example, 2-bromoethylbenzene, prototype compound for monovinylaryl compounds, and bis-(2-bromoethyl)benzene, prototype compound for divinylaryl compounds.

Advantageously the reactants are passed continuously through a reaction zone wherein they are exposed to the necessary radiation. When a batch process is used, the limiting time is that required for adding the hydrogen bromide.

Another form of this invention makes use of a circulating stream of a copper sulfate solution both as a filter and as a heat transfer medium wherein the circulating copper sulfate solution is externally cooled or heated to maintain the reaction temperature within the desired range.

It has been found that as the proportion of inert solvent is increased, both the conversion and yield of abnormal addition product increase. Generally proportions between one and twelve volume parts of inert solvent per part of vinylaryl compound are commercially attractive. The upper preferred limit is an economic limit only.

It has also been found that as the reaction temperature is decreased, the yield of abnormal addition product is increased. Therefore, a reaction temperature between 0° and 50° C. is preferred.

Atmospheric or substantially atmospheric or superatmospheric pressures can be used for the reaction.

In practice, a solution of a vinylaryl compound in an inert solvent, as indicated above, and hydrogen bromide gas are passed into a reactor having a light transmitting window which absorbs or filters out ultraviolet radiation with wavelengths below 2900 A. but is transparent to radiation with wavelengths of 2900 A. and longer, for example, a window of solarized Pyrex, Corex D or a cell of copper sulfate solution, as indicated. The reactants are taken to reaction temperature while exposed to the indicated light radiation to form the abnormal addition product of hydrogen bromide and vinylaromatic compound. Alternatively, a batch process can be used.

wherein hydrogen bromide gas is passed into a solution of a vinylaryl compound in an inert solvent, reaction conditions otherwise being similar. When reaction is complete, the reaction mixture is neutralized, suitably with anhydrous sodium carbonate, water-washed, dried and distilled, preferably in the presence of iron or from an iron pot to decompose any residual amounts of normal addition product of hydrogen bromide and vinylaryl compound which may have formed, and the desired abnormal addition product is recovered.

The following examples show ways in which the invention has been practiced.

*Example 1*

A feed consisting of two volumes of carbon tetrachloride per volume of styrene at a rate of 72 lbs. per hour, and hydrogen bromide gas at a rate of 14.4 lbs. per hour (15 percent excess) was passed through the annular space of a water-cooled cylindric photochemical reactor having an inside window of Corex D glass. A 1200-watt G.E. UA-11 lamp was placed in the inner well of the reactor. Ultraviolet radiation having wavelengths of 2900 A. and longer was thereby transmitted to the reaction zone. The reaction temperature was maintained at 30° C. During a running time of 8 hours, both the percent conversion of styrene and the percent yield of 2-bromoethylbenzene remained substantially constant at 99 percent. At the end of the run, no film was present on the reactor window. The recovered product had a boiling range of 217–218° C. at 734 mm. Hg, and was identified by infrared spectroscopy as 2-bromoethylbenzene.

In contrast thereto, a similar run differing only in the substitution of a Vycor 7910 window, transmitting radiation above 2200 A., in place of the Corex D window, gave progressively lower conversions and yields with increasing time due to an opaque film formation on the window. After 4 hours running time, the conversion of styrene had dropped from 99 percent to 82.8 percent, while the yield of 2-bromoethylbenzene had dropped from 99 percent to 71.5 percent. At the end of the run, a dense brown film was observed on the reactor window.

*Example 2*

The procedure of Example 1 was repeated, using a solarized Pyrex window, transmitting radiation above 3100 A. The conversion of styrene ranged between 91 and 95 percent, while the percent yield of 2-bromoethylbenzene was 89 during a 40 hour period. At the end of 40 hours, no film was present on the reactor window.

*Example 3*

The procedure of Example 1 was repeated, using as a radiation transmitting window a cell through which passed a solution containing 0.025 lb. of $CuSO_4 \cdot 5H_2O$ per lb. of water, the thickness of which was 0.5 cm. The temperature of the circulating copper sulfate solution was kept at 20° to 30° C. by an external cooler. The reaction temperature was 24° C. The conversion of styrene over a 4-hour period was 90 percent while the yield of 2-bromoethylbenzene was 90.5 percent. At the end of the run, no film formation was observed on the radiation transmitting window.

*Example 4*

A quantity of 12 ml. of vinyltoluene and 72 ml. of carbon tetrachloride was placed in a 100 ml. Pyrex flask which was equipped with a stirrer, gas sparger, thermometer, reflux condenser and water cooling. Hydrogen bromide gas was then sparged into the charge which was illuminated with a 100-watt S-4 ultraviolet lamp. The reaction temperature was maintained at 12°–19° C. After sufficient hydrogen bromide had been added to complete the reaction, the carbon tetrachloride was removed. The residual hydrobrominated product analyzed 93.5 percent methyl-(2-bromoethyl)benzene and 6.5 percent methyl-(1-bromoethyl)benzene, as determined by infrared spectroscopy.

Chloromethylstyrene and an isomeric mixture of dichlorostyrene were hydrobrominated in a similar manner to give yields of 2-bromoethyl derivatives in excess of 90 percent. Divinylbenzene was also hydrobrominated in a similar manner, except that the volume ratio of solvent to monomer was increased to 12:1. A yield of 87.4 percent of bis-(2-bromoethyl)benzene resulted, which was identified by the method of Walling, Kharasch, Mayo, J. Am. Chem. Soc. 61, 2693, 2696 (1939).

*Example 5*

A quantity of 18 ml. of styrene and 72 ml. of hexane was placed in a 125 ml. Pyrex flask which was equipped with a stirrer, gas sparger, thermometer, Dry Ice cooled condenser and air cooling. Hydrogen bromide gas was then sparged into the charge which was illuminated with an SA-4 type ultraviolet lamp. The reaction temperature was kept at 25°–30° C. After completion of the reaction, the reaction mixture was neutralized with anhydrous sodium carbonate, filtered and the heptane was removed. The residual product analyzed 96 percent 2-bromoethylbenzene and 4 percent α-bromoethylbenzene. Conversion of styrene amounted to 99.5 percent.

What is claimed is:

1. A method for abnormally adding hydrogen bromide to a vinylaryl compound which method comprises reacting a vinylaryl compound with gaseous hydrogen bromide in the presence of ultraviolet light radiation consisting of wavelengths ranging from 2900 A. and above, and separating and recovering the abnormal addition product from the reaction medium.

2. The method of claim 1 wherein the reaction is carried out in an inert solvent medium, the proportion by volume of inert solvent medium to vinylaryl compound being at least one part of solvent per part of vinylaryl compound.

3. The method of claim 2 wherein the reaction temperature is maintained between the freezing point of the solvent and 100° C.

4. The method of claim 3 wherein a circulating film of aqueous cupric sulfate solution 0.5 cm. thick having a proportion of 0.025 lb. of $CuSO_4 \cdot 5H_2O$ per lb. of water is used both as a filter to transmit ultraviolet light radiation consisting of wavelengths of 2900 A. and longer to the reaction medium and as a heat transfer medium to maintain the reaction medium between 0° and 50° C.

5. The method of claim 3 wherein the vinylaryl compound is styrene.

6. The method of claim 3 wherein the vinylaryl compound is vinyltoluene.

7. The method of claim 3 wherein the vinylaryl compound is divinylbenzene.

8. The method of claim 3 wherein the inert solvent is carbon tetrachloride.

9. The method of claim 3 wherein the inert solvent is hexane.

10. In a photochemical method for the abnormal addition of hydrogen bromide to a vinylaryl compound which method is catalyzed by light radiation, the improvement wherein a competing photopolymerization reaction is substantially minimized, which consists in filtering out from the incident ultraviolet light radiations those wavelengths below 2900 A.

References Cited in the file of this patent

UNITED STATES PATENTS 2,307,552   Vaughan et al. _____ Jan. 5, 1943

OTHER REFERENCES

Walling et al.: J. Am. Chem. Soc., vol. 61 (1939), pp. 2693 and 2696.